United States Patent [19]

Fox

[11] Patent Number: 5,014,308
[45] Date of Patent: May 7, 1991

[54] CIRCUIT ARRANGEMENT FOR PROVIDING POWER FOR AN IC CHIP IN A TELEPHONE SUBSET

[75] Inventor: Ronald C. S. Fox, Randwick, Australia

[73] Assignee: Alcatel, N.V., Amsterdam, Netherlands

[21] Appl. No.: 475,175

[22] Filed: Feb. 5, 1990

[30] Foreign Application Priority Data

Feb. 9, 1989 [AU] Australia ................. PJ2619

[51] Int. Cl.$^5$ .................. H04M 19/00; H04M 19/08
[52] U.S. Cl. ...................................... 379/413; 379/324
[58] Field of Search ................ 379/412, 413, 387, 324

[56] References Cited

U.S. PATENT DOCUMENTS

| | | | |
|---|---|---|---|
| 4,532,382 | 7/1985 | Pommer, II | 379/324 |
| 4,547,629 | 10/1985 | Corless | 379/412 |
| 4,591,666 | 5/1986 | Boeckmann | 379/412 X |
| 4,636,588 | 1/1987 | Nakayama et al. | 379/387 X |
| 4,647,787 | 3/1987 | Pommer, II | 379/413 |

FOREIGN PATENT DOCUMENTS

| | | | |
|---|---|---|---|
| 0150364 | 8/1985 | Japan | 379/413 |
| 0283264 | 12/1986 | Japan | 379/413 |

*Primary Examiner*—James L. Dwyer
*Assistant Examiner*—M. Shehata
*Attorney, Agent, or Firm*—Christie, Parker & Hale

[57] ABSTRACT

A battery-less telephone subset retains data in its processor memory with a storage capacitor which is kept charged by three controlled charge circuits which deliver power from the line to the capacitor under various line conditions and phone states. The first charge circuit charges the circuit initially, the second charge circuit then charges the capacitor (6.8 v) while all subsets remain on-hook (line voltage 50 v). When a second subset goes off-hook and the line voltage drops (to about 10 v), the capacitor is charged by the third charge circuit at a lower voltage (3.5 v) that is nevertheless sufficiently high to maintain the first subset's on-hook functions. Preferably, the third circuit is controlled by the subset's line switch control circuit, thereby minimizing the number of required components.

11 Claims, 1 Drawing Sheet

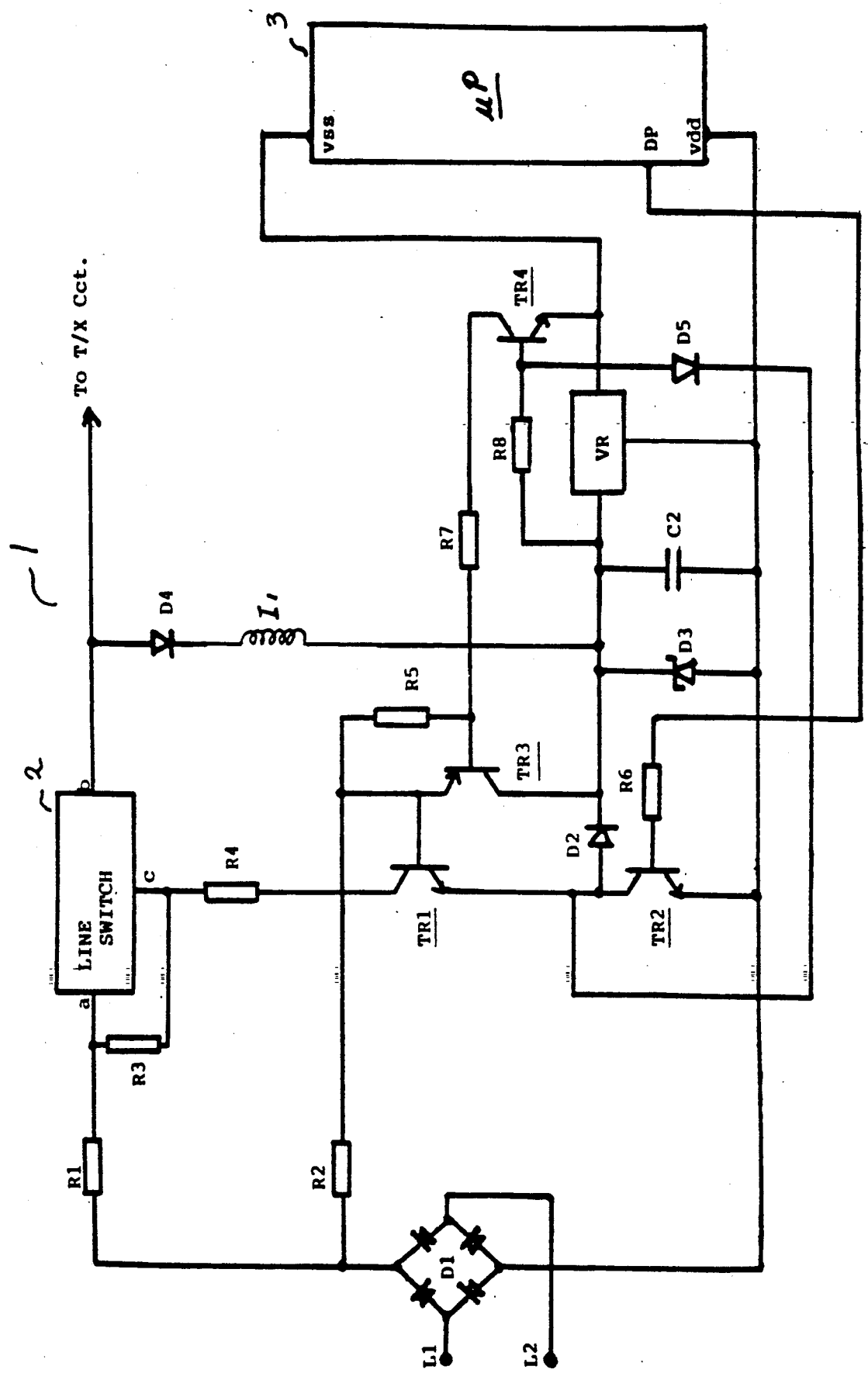

CIRCUIT ARRANGEMENT FOR PROVIDING POWER FOR AN IC CHIP IN A TELEPHONE SUBSET

TECHNICAL FIELD

This invention relates to telephone subsets and in particular to telephone subsets of the high voltage type which incorporate a semiconductor line switch and at least one microprocessor to perform and control various circuit functions such as visual display, memory dialling, clock, calendar, call duration timer, alarm etc. Some of these functions are required when the subsets are in the on-hook mode.

BACKGROUND ART

Telephone subset microprocessors require relative high current for operation and normally, when one such subset is connected to a single exchange line and is in the on-hook mode, the microprocessor is energized by energy stored in a storage capacitor. The voltage across the storage capacitor is monitored such that when it is below a predetermined value a control circuit operates the line switch to rapidly charge the storage capacitor to a voltage sufficient to maintain the microprocessor. Thereafter the voltage on the storage capacitor is maintained via a bleed circuit.

When, however, two or more such subsets are connected in parallel to a single exchange line, a problem arises in providing sufficient energizing power to the microprocessor of any subset in the on-hook mode when one other subset is in the off-hook mode. Momentarily operating the line switch, as described above, in the subset/s in the on-hook mode is highly undesirable because of interference which this would cause to the transmission from the off-hook subset.

DISCLOSURE OF INVENTION

It is therefore an object of the present invention to provide an arrangement for providing power to microprocessor means incorporated in a telephone subset, which avoids the aforementioned disadvantage.

According to the present invention, in a telephone subset of the high voltage type incorporating line terminal means, at least one processor means and a controllable semiconductor line switch means, a circuit arrangement for providing power, derived from line current connected to the line terminal means, to said processor means when said telephone subset is in an on-hook mode and voltage dropped across said line terminal means is either of a first magnitude, or a second magnitude which is below first magnitude, said circuit arrangement comprising a storage capacitor means coupled across power terminal means of said processor means, a first capacitor charging circuit adapted to operate said line switch means for a short predetermined period when said subset is in the on-hook mode and connect said line current via the operated line switch means to said storage capacitor means to charge said storage capacitor means to a first predetermined voltage and thereafter maintain said first predetermined voltage with a second storage capacitor charging circuit which couples said line current to said storage capacitor means, wherein said circuit arrangement includes a third capacitor charging circuit for maintaining a charge of a second predetermined voltage, of less magnitude than said first predetermined voltage, across said storage capacitor means when the voltage across said line terminal means is of said second magnitude to power said processor means.

BRIEF DESCRIPTION OF DRAWINGS

In order that the invention can be readily understood an embodiment thereof will now be described with reference to the FIGURE of the accompanying drawing which shows a schematic circuit of part of a high voltage telephone subset.

BEST MODE FOR CARRYING OUT THE INVENTION

Referring to the drawing, subset circuit 1 includes a polarity guard arrangement D1 to whose input terminals are connected line L1 and L2 terminals for connection to an exchange line (not shown) and across which a parallel subset (not shown) may be connected. The negative output of polarity guard D1 is connected to the subsets—ve voltage rail VDD, and the positive output is connected to terminal "a" of a controllable semiconductor line switch 2. The line switch's controllable switching path appears across said terminal "a" and "b" thereof. The control element input of the line switch is at terminal "c" which is connected to a high voltage line switch control transistor TR1 via resistor P.4. Terminal "b" of the line switch is coupled to the subset's transmission circuit (T/X) (not shown). The subset's circuit further comprises a microprocessor (uP)3, a storage capacitor C2 and a parallel voltage reference device in the form of zener diode D3 coupled across terminals VSS and VDD of microprocessor 3 via the "in" terminal and "out" terminal of a conventional three terminal voltage regulator VR. The characteristics of voltage regulator VR ensure a constant 3 volts at the "out" terminal irrespective of any voltage above 3 volts at its "in" terminal. The subset circuit further includes a first capacitor charging circuit comprising line terminal L1, resistor R1, line switch 2, diode D4, inductance I1 to plate of capacitor C2; a second capacitor charging circuit comprising line terminal L1, resistor R2, collector/emitter junction of transistor TR3 to plate of capacitor C2; and a third capacitor charging circuit comprising line terminal L1, resistors R1, R3 and R4, collector/emitter junction of transistor TR1, diode D2 to plate of capacitor C2. The base element of transistor TR2 is coupled via resistor R6 to the "DP" terminal of microprocessor 3 and controlled thereby. A diode D5 couples the collector/emitter junction of transistor TR2 to the base of transistor TR4 whose collector/emitter junction is coupled to the base of transistor TR3. Inductance I1 in the first capacitor charging circuit ensures that speech current is not shunted away from the transmission circuit.

In operation, when the line terminal L1 and L2 of the on-hook subset and a parallel on-hook subset (not shown) are initially connected to an exchange line with capacitor C2 uncharged, 50 v exchange battery appears across line terminals L1 and L2 subset, transistor TR1 is turned on via resistor R2. Line switch 2 is thereby turned on via resistor R4 and terminal "c". Line current via L1, resistor R1, switching path "a"–"b" of line switch 2, diode D4, inductance I1 charges capacitor C2 which rapidly charges to 3.5 volts whereupon transistors TR4 and TR3 turn on. Transistor TR1 is now turned off and thus turns off the line switch. The 3.5 volt charge on capacitor C2 is sufficient to energize microprocessor 2 which thereupon produces a signal at terminal DP for 1 second. This signal is extended to the base element of transistor TR2 via resistor R6. Transistor TR2 operates and thereby operates transistor TR1. Line switch 2 operates and connects line current via line terminal L1, switching path "a"-"b" of line switch 2, diode D4, inductance I1 to storage capacitor C2. The voltage across capacitor C2 now rises to 6.8 volts equal to the knee voltage of zener diode D3. After 1 second the microprocessor removes the signal from terminal DP, transistor TR2 and TR1 turn off in turn. The relatively high voltage across capacitor C2 ensures that transistor TR1 is fully turned off. This is necessary to prevent transistor TR1 from presenting a DC loop to the exchange equipment during an incoming ring condition, and tripping the ring. The charge on capacitor C2 is maintained at the zener voltage (6.8 volts) by line current via line terminal L1, resistor R2 and collector/emitter path of transistor TR3. Voltage regulator VR now provides a regulated 3 V at VSS of microprocessor 2 which ensures sufficient power to provide any on-hook functions.

In the event of the parallel subset going off-hook, the microprocessor 2 in subset circuit 1 which is in on-hook mode still requires about 12 uA to provide on-hook functions. As soon as the parallel subset goes off-hook the voltage across the line terminals L1 and L2 drops from 50 volts to about 10 volts. This causes the voltage across capacitor C2 to decay from 6.8 volts towards 3.5 volts. This occurs because the voltage across resistor R2 is not sufficient enough to provide the 12 uA required by microprocessor 2.

When the voltage across capacitor C2 falls to 3.5 volts the difference between the voltage on the "in" terminal and the voltage on the "out" terminal of voltage regulator VR falls to 0.5 volts and therefore the b/e voltage of transistor TR4 is not sufficient to keep that transistor on. Transistors TR4 and TR3 turn off. Line current via resistor R2 is now directed into the base of transistor TR1 which is turned on sufficiently to conduct enough current to maintain capacitor C2 at 3.5 volts. If the voltage across capacitor C2 rises above 3.5 volts transistors TR3 and TR4 turn on more, thereby subtracting base current from transistor TR1. Line current via line terminal L1, resistors R1, R3, R4 collector/emitter of transistor TR1, diode D2 maintains, by virtue of the regulating effect of transistor TR1, a voltage of 3.5 volts across capacitor C2. This current, however, which is typically 12 uA, is insufficient to turn on line switch 1.

While the present invention has been described with regard to many particulars, it is understood that equivalents may be readily substituted without departing from the scope of the invention.

The claims defining the invention are as follows:

I claim:

1. In a first telephone subset of the high voltage type incorporating line terminal means, at least one processor means having a power terminal means, and a controllable semiconductor line switch means, a circuit arrangement for providing power, derived from line current connected to the line terminal means, to said processor means when said first telephone subset is in an on-hook mode and voltage dropped across said line terminal means is either above a predetermined magnitude when a second high voltage subset connected across said line terminal means is in an on-hook mode, or is below said predetermined magnitude as a result of said second subset being in an off-hook mode, said circuit arrangement comprising:

a storage capacitor means coupled across said power terminal means of said processor means, a first capacitor charging circuit for operating said line switch means for a short predetermined initial period when said subset is in the on-hook mode and connecting said line current via the operated line switch means to said storage capacitor means to initially charge said storage capacitor means to a first predetermined voltage, a second capacitor charging circuit for thereafter maintaining the charge on said storage capacitor at said first predetermined voltage while said line switch means is no longer being operated and said first and second telephone subsets remain in the on-hook mode, by coupling said line current to said storage capacitor means independently of said line switch means, and a third capacitor charging circuit which is coupled to said storage capacitor means only when said voltage dropped across the said line terminal means is below said predetermined magnitude as a result of the second subset being in its off-hook mode, said third capacitor charging means maintaining a charge of a second predetermined voltage, of less magnitude than said first predetermined voltage, across said storage capacitor means to power said processor means, while the first subset remains in its on-hook mode and the second subset remains in its off-hook mode.

2. A circuit arrangement as claimed in claim 1, wherein said first capacitor charging circuit includes a first semiconductor switch means a switching path of which is coupled to a control element of said controllable semiconductor line switch, and a control element of which is coupled to an output of said processor means at which is provided a signal for a short predetermined period to momentarily operate said first semiconductor switch means and connect line current to said capacitor storage means via a path including the so operated said line switch to charge said storage capacitor means to said first predetermined voltage.

3. A circuit arrangement as claimed in claim 2, wherein said path connecting said line current to said storage capacitor means further includes a serially connected diode and inductance.

4. A circuit arrangement as claimed in claim 1, wherein said second capacitor charging circuit includes a second semiconductor switch means a switching path of which is connected between said line terminal means and said storage capacitor means and a control element of which is coupled to said power terminal means of said processor means, whereby said second semiconductor switch means is rendered conducting when the charge on said storage capacitor means reaches said first predetermined voltage.

5. A circuit arrangement as claimed in claim 1, including a voltage regulator means having an input coupled to said storage capacitor means and an output coupled to said power terminal means, said voltage regulator's characteristics being such that a substantially constant third predetermined voltage is provided at said output when the charge on said capacitor storage means is either of the first predetermined voltage or the second predetermined voltage.

6. A circuit arrangement as claimed in claim 5, wherein said voltage regulator means is a three terminal voltage regulator.

7. A circuit arrangement as claimed in claim 5, wherein said third capacitor charging circuit includes said first semicondutor switch means whose said switching path couples said line terminal means to said storage capacitor means, and whose control element is coupled to a voltage controlled device, said voltage controlled device being arranged to monitor the difference between a voltage on the input and the voltage on the output of said voltage regulator means and when said difference equals a fourth predetermined voltage, cause said first semiconductor switch means to conduct sufficient line current to maintain a charge of said second predetermined voltage on said storage capacitor means.

8. A circuit arrangement as claimed in claim 7, wherein said voltage controlled device comprises a third semiconductor switch means a switching path of which is coupled between the control element of said first semiconductor and the output of said voltage regulator means, and a control element of which is coupled to the input of said voltage regulator means, said third semiconductor switch means being rendered non-conducting when the difference between the voltage on the input and the voltage on the output of the voltage regulator means equals said fourth predetermined voltage.

9. A circuit arrangement as claimed in claim 8, wherein said switching path of said third semiconductor switch means is connected to the control element of said second semicondutor switch means, which is rendered non-conducting when said third semiconductor switch is non-conducting, the charge on said storage capacitor means being maintained by said third capacitor charging circuit.

10. A circuit arrangement as claimed in claim 2, wherein a voltage reference device is connected across said storage capacitor means.

11. A circuit arrangement as claimed in claim 10, wherein said voltage reference device is a zener diode.

* * * * *